Nov. 8, 1932.                C. KAPNER                1,887,354
                           DRIP COFFEE MAKER
                  Filed June 2, 1931      2 Sheets-Sheet 1

INVENTOR
Charles Kapner
BY
N. E. Dunlap
ATTORNEY

Nov. 8, 1932.  C. KAPNER  1,887,354
DRIP COFFEE MAKER
Filed June 2, 1931  2 Sheets-Sheet 2

INVENTOR
Charles Kapner
BY
N. E. Dunlap
ATTORNEY

Patented Nov. 8, 1932

1,887,354

UNITED STATES PATENT OFFICE

CHARLES KAPNER, OF BELLAIRE, OHIO

DRIP COFFEE MAKER

Application filed June 2, 1931. Serial No. 541,603.

This invention relates broadly to coffee making apparatus, and more specifically to a coffee pot of the so-called "tricolator" type more or less commonly employed for the making of drip coffee.

The primary object of the invention is to provide a simplified construction of drip coffee maker which shall possess certain marked advantages over the usual commercial forms of devices of this general type.

A further object is to provide a device of the character mentioned embodying a pot, a water reservoir superposed on said pot, and a coffee container located within the top portion of the pot, said container being constructed and so supported relative to said pot that the overflow of water resulting from ebullition occurring within said container may freely pass to the pot, thus to relieve the ebullition condition.

In describing the invention in detail, reference is herein had to the accompanying drawings, in which—

Figure 1:
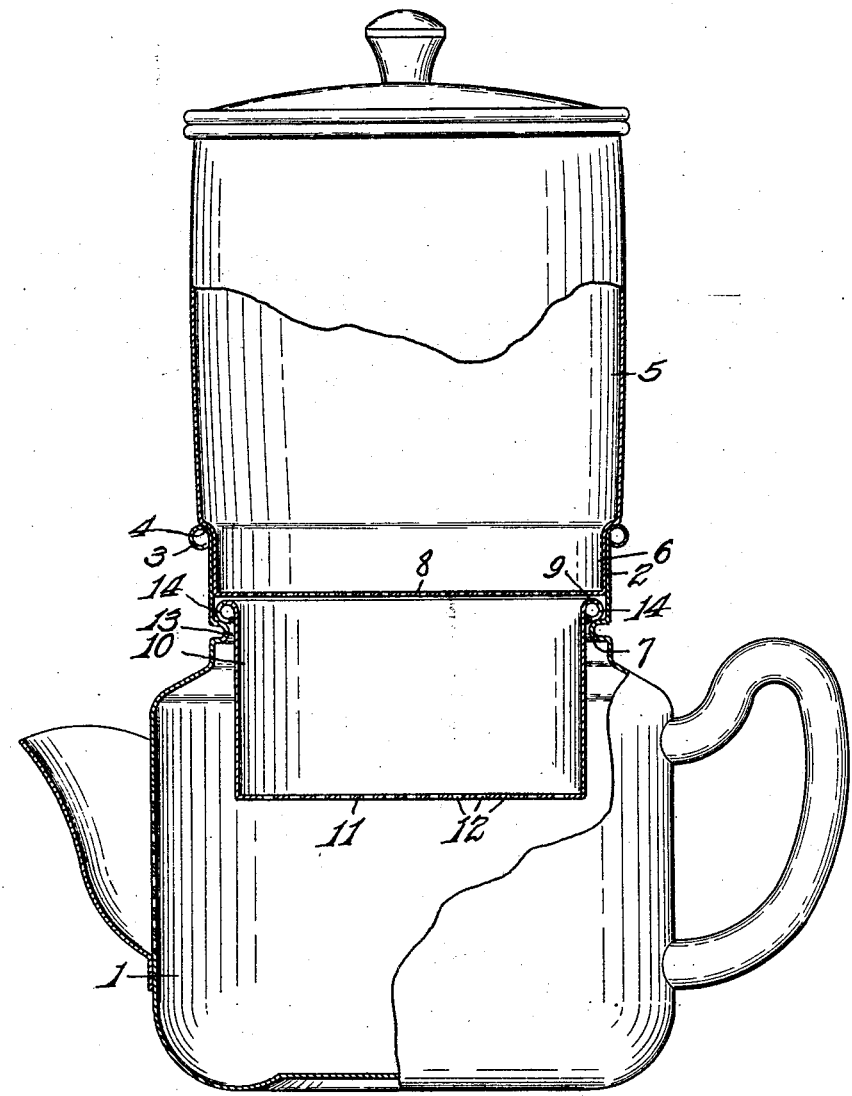
Figure 1 is a vertical section of a tricolator embodying my invention.
Figure 2:
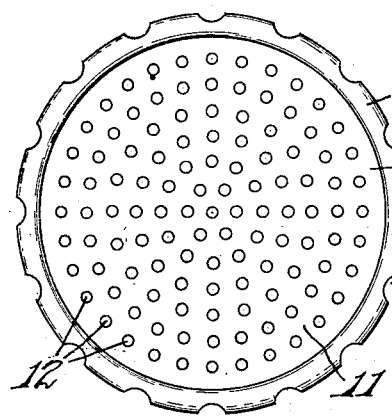
Figure 2 is a top plan view of the coffee container, detached.
Figure 5:
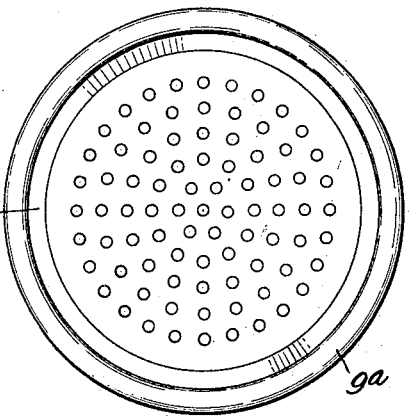
Figure 5 is a top plan view of the coffee container of the modified structure.
Figure 3:
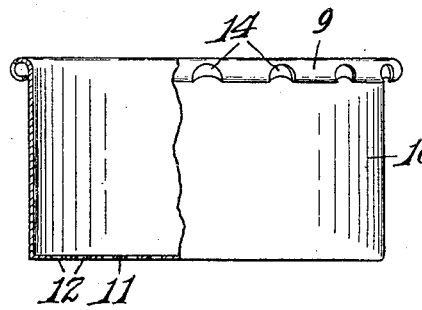
Figure 3 is a view of the same, partly in side elevation and partly in vertical section.
Figure 6:
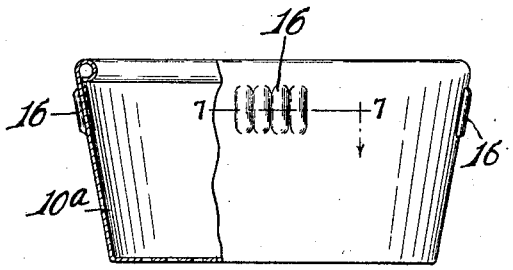
Figure 6 is a view of the same, partly in side elevation and partly in section; and—

Referring to said drawings, 1 designates a beverage pot having a cylindrical neck portion 2 with a terminal bead or roll 3. Said roll is adapted to seat in underlying supporting relation to an annular shoulder 4 formed on a water reservoir 5 having a perforated bottom. Said shoulder is located at, or defines, the upper end of a reduced lower end 6 which is formed on said reservoir and which is received more or less closely within the embrace of said neck portion 2 of the pot.

An internal annular bead 7 is formed in the neck 2 at a spaced distance from the roll 3 so as to be positioned in spaced relation to the perforated bottom 8 of the water reservoir 5 when the latter is seated on said pot. Said bead forms a seat for an outwardly turned terminal roll 9 formed on the upper end of the ground coffee container 10. This container may be of the cylindrical form shown, or it may, if preferred, be tapered somewhat toward its bottom 11, which latter is provided with suitably arranged perforations 12 through which is permitted drainage from the interior of the container to the pot.

That portion of the coffee container body located directly beneath the roll 9 and which is encircled by the bead 7 possesses such less diameter than said bead that, in the seated position of said container, it is maintained out of contact with said bead, thus to provide an intermediate space or channel, designated by the reference character 13, through which ebulliating water overflowing said container may drain to the pot. Also, to provide avenues through which such ebulliating water may freely pass intermediate said bead and the thereon-seated roll of the coffee container, the metal of the under portion of said roll is recessed, preferably by the provision therein of a series of spaced serrations or notches 14.

Figure 4:
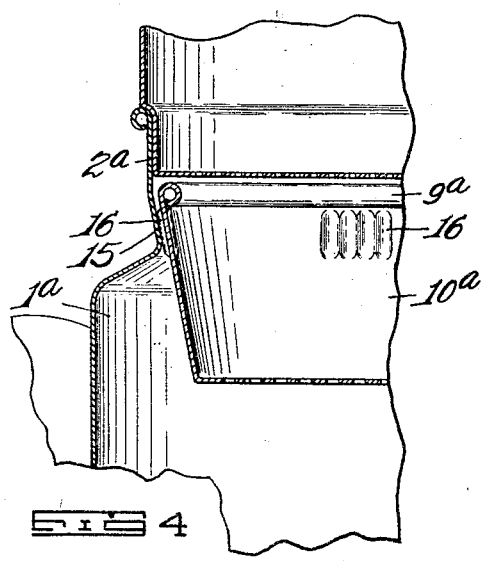
Figure 4 is a detail section showing a modified construction.
Figure 7:
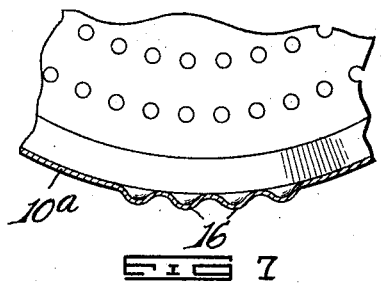
Figure 7 is an enlarged detail section on line 7—7, Fig. 6.

In the modified construction shown in Figs. 3 to 7, inclusive, the neck 2ᵃ of the beverage pot 1ᵃ has its lower portion tapered, forming a downwardly and inwardly inclined internal annular seat 15 upon which may rest the coffee container 10ᵃ, the latter having its walls similarly inclined with outwardly thrust corrugations 16 formed therein at the proper level for resting upon said seat, as is shown in Fig. 4. The corrugations provide passages or avenues through which ebulliating water may drain to the pot. Such corrugations may be continuous throughout the circumference of the container 10ª, but they are herein shown as provided in separate areas occupying spaced relation in the circumference of the container. Obviously, the walls of said container 10ª between adjacent corrugated areas are disposed inwardly with respect to, or out of seating engagement with, the seat 15, thus affording intermediate passages or avenues through which, as well as through the spaces between adjacent corrugations, overflowing water of ebullition may unobstructedly drain to the pot.

In said modified form of the coffee container 10ª, the terminal roll 9ª is turned inwardly instead of outwardly, thus not only to avoid obstruction of the flow of ebulliating water to said drainage passages, but also to afford means whereby said container may conveniently be grasped to effect its removal from the pot.

What is claimed is—

1. In a drip coffee maker, a pot having a neck provided with an internal annular bead, a water reservoir adapted to seat upon said pot above said bead, and a coffee container suspended within said pot with its walls occupying spaced relation to said bead, said container having a rim roll for seating upon said bead, the under side of said roll having an irregular seating surface providing avenues for drainage past said bead for overflowing water of ebullition.

2. In a drip coffee maker, a pot having a neck provided with an internal annular bead, a water reservoir adapted to seat upon said pot above said bead, and a coffee container suspended within said pot with its walls occupying spaced relation to said bead, said container having a rim roll for seating upon said bead, said rim roll being recessed to afford avenues through which may drain overflowing water of ebullition.

3. In a drip coffee maker, a pot having a neck provided with an internal annular bead, a water reservoir adapted to seat upon said pot above said bead, and a coffee container suspended within said pot with its walls occupying spaced relation to said bead, said container having a rim roll for seating upon said bead, said rim roll having in its under side a plurality of notches providing avenues for drainage of overflowing water of ebullition.

4. In a drip coffee maker, a pot having a neck with a downwardly and inwardly inclined seat formed in its walls, a coffee container mounted interiorly of said neck, said container having its walls inclined substantially to correspond to the inclination of said seat and having in said walls outwardly thrust portions for resting upon said seat and having other portions intermediate said seating portions removed from said seat to provide avenues for drainage of overflowing water of ebullition, said container having an inwardly turned terminal roll.

5. In a drip coffee maker, a pot having a neck with a downwardly and inwardly inclined seat formed in its walls, a coffee container mounted interiorly of said neck and having outwardly projecting portions formed in its walls resting upon said seat, said container having an inwardly directed annular terminal edge portion.

In testimony whereof, I affix my signature.

CHARLES KAPNER.